Figure 1:
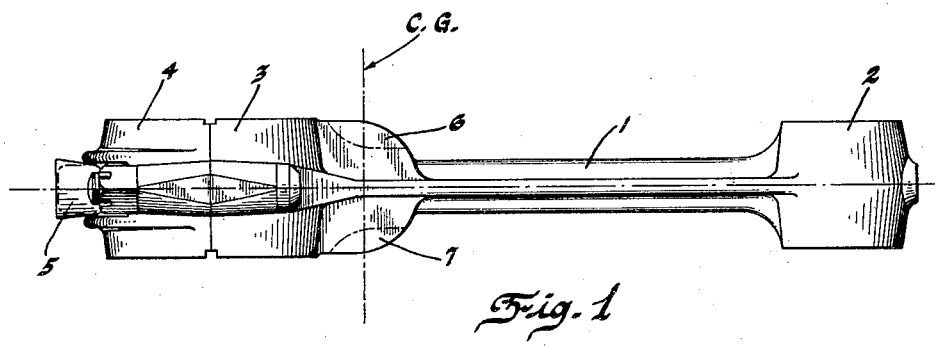

April 25, 1933.  W. H. MANNING  1,905,925

METHOD OF MAKING CONNECTING RODS

Filed April 16, 1931

Inventor
William H. Manning

By Blackmore, Spencer & Flint
Attorneys

Patented Apr. 25, 1933

1,905,925

UNITED STATES PATENT OFFICE

WILLIAM H. MANNING, OF PONTIAC, MICHIGAN, ASSIGNOR TO GENERAL MOTORS CORPORATION, OF DETROIT, MICHIGAN, A CORPORATION OF DELAWARE

METHOD OF MAKING CONNECTING RODS

Application filed April 16, 1931. Serial No. 530,591.

In quantity production manufacture it is highly desirable that certain standards be set and met by the parts that go into the finished product. This not only results in uniformity of product, but it reduces costs and the amount of handling necessary. Much progress has already been made in this direction, but I find that the work can be extended further to advantage, and my invention hereinafter described constitutes an additional step and a refinement on existing practice.

In the matter of connecting rods for transmitting motion between the crankshaft and pistons of a multiple cylinder internal combustion engine, the manufacturer aims to employ in each engine a set of connecting rods, in which the rods have similar or identical characteristics. Pistons and other moving parts for a given engine are also selected with care in order that smooth engine operation may be had. All of this calls for precision manufacture and in addition a matching or grading of the parts as to size, weight, center of gravity and other controlling factors. For example, in the plant of the Oakland Motor Car Company, connecting rods are selected and grouped, first by weighing, the rods being put in certain weight classifications, varying within ⅛ ounce, second, by determining the position of the center of gravity, and third, by measuring the size of the piston pin bushing. The various combinations made up by this classification numbers around 245. Obviously such a large number of different groups involves a great deal of handling, takes up considerable floor space and necessitates large inventories.

It may be mentioned, incidentally, that most connecting rods are forgings and this accounts in a measure for weight variations in rods made in the same die, for among other things a forging die surface gradually wears away in use and eventually the die must be discarded. It follows that a forging made when the die is new will weigh less than one made after the die has seen considerable service and particularly near the end of the life of the die.

To reduce the number of classifications and provide for the manufacture of rods or other parts that more nearly approach uniformity and duplication of essential characteristics is one of the primary objects of the present invention. To this end it is proposed, according to a specific embodiment of the invention, to provide each rod with parts or specially designed and positioned bosses, in which the amount of material can be varied first to shift the center of gravity of the rod to or within certain limits and then after the position of the center of gravity is established to bring the total weight of the rod to a given value without disturbing the center of gravity location. By this procedure all rods will be identical as to the location of the center of gravity and total weight, and classification as before mentioned will be limited to piston pin bushing size only, which means practically a reduction in the number of groups from 245 to approximately 5.

Figure 2:
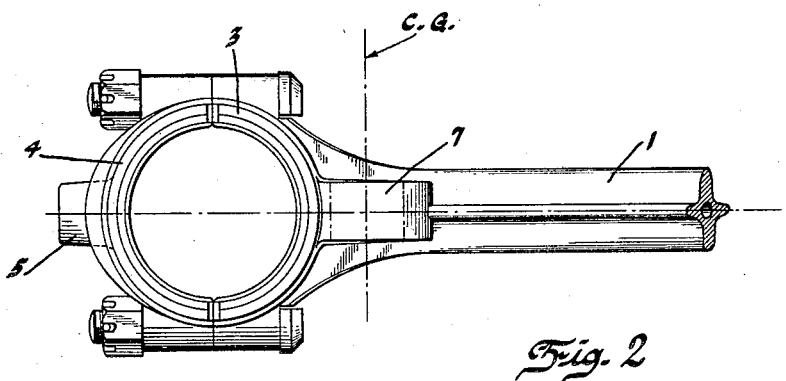

To better explain the balancing method involved, use will be made of the accompanying drawing, wherein Figure 1 is a side elevation of a connecting rod, and Figure 2 is a similar view of the same rod turned 90° from the position shown in Figure 1.

In the drawing the numeral 1 represents the shank of the connecting rod of cross shape in section. At one end the shank terminates in a cylindrical portion 2, to receive the usual pin by which connection is made to the piston. At its opposite or crankshaft end the shank is provided with an enlarged semi-circular bearing part 3, to which is removably secured the bearing cap 4. This rod, which as thus far described, is of conventional design, is provided at the cap 4 with a lug or boss 5 and with bosses 6 and 7 on opposite sides of the shank adjacent the enlargement 3. From these bosses material can be removed for balancing the rod and bringing it within given specifications as to center of gravity location and total weight without weakening any portion that takes stress. This removal of material and final shape of the bosses is indicated for illustrative purposes by the dotted lines in Figure 1.

The dot and dash line CG indicates the desired location for the center of gravity, it being understood that such location is predetermined for any given rod design.

It will be understood that prior to the balancing operation the center of gravity is located a short distance away from the line CG and toward the large bearing end or crank pin end 3. Any suitable mechanism may be used to first determine how far off from the desired point the center of gravity of the unbalanced rod may be, and from this it may be ascertained easily how much material must be removed from the balancing boss 5 to shift the center of gravity toward and on the line CG. After the center of gravity is properly located by the removal of material from the boss 5, the over-weight of the rod is found and excess material is then removed from the total weight bosses 6 and 7. For this purpose two specially formed milling cutters may be used, one coming in from either side and being so arranged that they will remove an equal amount of material on opposite sides of the established center of gravity location represented by the line CG. In other words, any material removed from the boss will have its center of gravity on the line CG and, therefore, no change is effected in the location of the center of gravity of the rod. When both operations have been completed the center of gravity will be at a given point and the total weight of a given value. Therefore, any rods which are operated upon in this fashion, will be identical as to these characteristics and may all be placed in the same group.

While I have referred herein specifically to the balancing of connecting rods, the invention is not necessarily limited to any particular article to be operated upon.

I claim:

1. The method of making a connecting rod to certain given standards which includes the formation of a rod with excess material at one end thereof and at a predetermined intermediate portion respectively, the removal of material from adjacent said end of the rod to shift the center of gravity longitudinally of the rod to a given location adjacent the excess material at said intermediate portion and then the additional removal of material from said intermediate portion to bring the total weight of the rod within given limits.

2. The method of making a connecting rod to set specifications, including forming a rod with parts at one end and at an intermediate point for subsequent variation in weight varying the weight of said end part to thereby place the center of gravity at a given location and then changing the weight of the intermediate part in equal amounts on both sides of the center of gravity to bring the total weight of the rod to a given value without disturbing center of gravity location.

3. The method of making a connecting rod or the like to set standards, including forming a rod initially with excess material at a given intermediate point and one end, removing material from said end of the rod to bring that portion of the rod on one side of said given point into balance with the portion thereof on the opposite side of said point and then removing material from both portions immediately adjacent said point in balanced amounts until the rod reaches a given total weight.

4. The method of making a connecting rod or the like to set standards, including forming a rod initially with parts at an end and a predetermined intermediate point which are capable of variation in amounts of material contained therein, varying the amount of material in said end part until the rod portions on either side of said intermediate point are in balance, and then changing the amount of material in each portion adjacent said point without disturbing the balanced relation of said portions in order to bring the rod to a given total weight.

5. The method of making connecting rods or the like including forming a rod initially with excess material at one end and at a given intermediate point, removing material from adjacent said end of the rod until the weight of that portion of the rod to one side of said given intermediate point balances the weight of the portion on the other side of said point, and thereafter removing additional material from the rod adjacent said intermediate point and in balanced amounts on opposite sides thereof to effect a given total weight.

6. The method of making connecting rods including forming a rod with enlargements adjacent one end and adjacent an intermediate point, respectively, from which material can be removed both for shifting the center of gravity and for reducing the total weight of the rod, removing sufficient material from the end enlargement to shift the center of gravity to a predetermined position in alinement with the intermediate enlargement, and then removing sufficient material from said intermediate enlargement in balanced amounts on opposite sides of the center of gravity to reduce the total rod weight to a given value.

7. The method of making connecting rods to given standards which includes forming a rod shank with a pair of bosses intermediate its ends and on opposite sides of its longitudinal axis, forming a bearing cap with an outwardly projecting end boss, then assemblying the rod parts and removing material from the last mentioned boss to bring the center of gravity of the rod assembly to a predetermined point within the limits of said pair of bosses and finally removing material from said pair of bosses in equal amounts on opposite sides of the center of gravity to reduce the total weight of the rod to a given value without disturbing longitudinally the position of the previously located center of gravity.

8. The method of making connecting rods to given standards which includes forming a rod with a pair of bosses intermediate its ends and on opposite sides of the longitudinal axis and with a boss at one end thereof, then removing material from the end boss to shift the center of gravity longitudinally to predetermined alinement with said pair of bosses and finally removing material from one or both of said pair of bosses to shift the center of gravity laterally to predetermined position and bring the rod to a given total weight.

In testimony whereof I affix my signature.

WM. H. MANNING.